United States Patent

[11] 3,629,675

| | | |
|---|---|---|
| [72] | Inventor | Nachum Porath<br>59 Rothschild Blvd., Tel Aviv, Israel |
| [21] | Appl. No. | 86,216 |
| [22] | Filed | Nov. 2, 1970 |
| [45] | Patented | Dec. 21, 1971 |

[54] CONTROL SYSTEM FOR ELECTRIC MOTORS
6 Claims, 5 Drawing Figs.

[52] U.S. Cl. ................................................ 318/138,
 318/254
[51] Int. Cl. ..................................................... H02k 29/00
[50] Field of Search .......................................... 318/138,
 254, 685, 696

[56] References Cited
UNITED STATES PATENTS

| 3,200,315 | 8/1965 | Thompson ................... | 318/138 |
| 3,374,410 | 3/1968 | Cronquist et al. ............ | 318/685 |
| 3,509,438 | 4/1970 | Kachuk ...................... | 318/254 X |

*Primary Examiner*—Gene Z. Rubinson
*Attorney*—Benjamin J. Barish

ABSTRACT: A control system for a brushless, permanent magnet, electric motor having a rotor including at least two poles forming a rotor pole pair, and a stator including at least two poles forming a stator pole pair, each stator pole having a first and a second bifilar winding. Power supply and control means are provided for energizing the stator bifilar windings to provide polarization zones which are periodically reversed to form a rotating magnetic field for driving the rotor. The latter means comprises an alternating current source having a frequency of at least several multiples of the rate of zone reversal at maximum motor speed. The said means further comprises switching means connecting the alternating current source to the first bifilar winding of each stator pole for energizing same with a plurality of half-cycle alternations of one sign when a reference point on the rotor arrives at the beginning of one zone of the stator, which switching means also connects the alternating current source to the second bifilar winding of each stator pole for energizing same with a plurality of half-cycle alternations of opposite sign when the rotor reference point arrives at the next, oppositely polarized zone of the stator. The system further includes torque control means controlling the switching mean to control the time of initiation of energization of the energized bifilar windings during each half-cycle alternation, the energized windings being automatically deenergized by the switching means at the end of each half-cycle alternation.

3,629,675
PATENTED DEC 21 1971
SHEET 1 OF 2
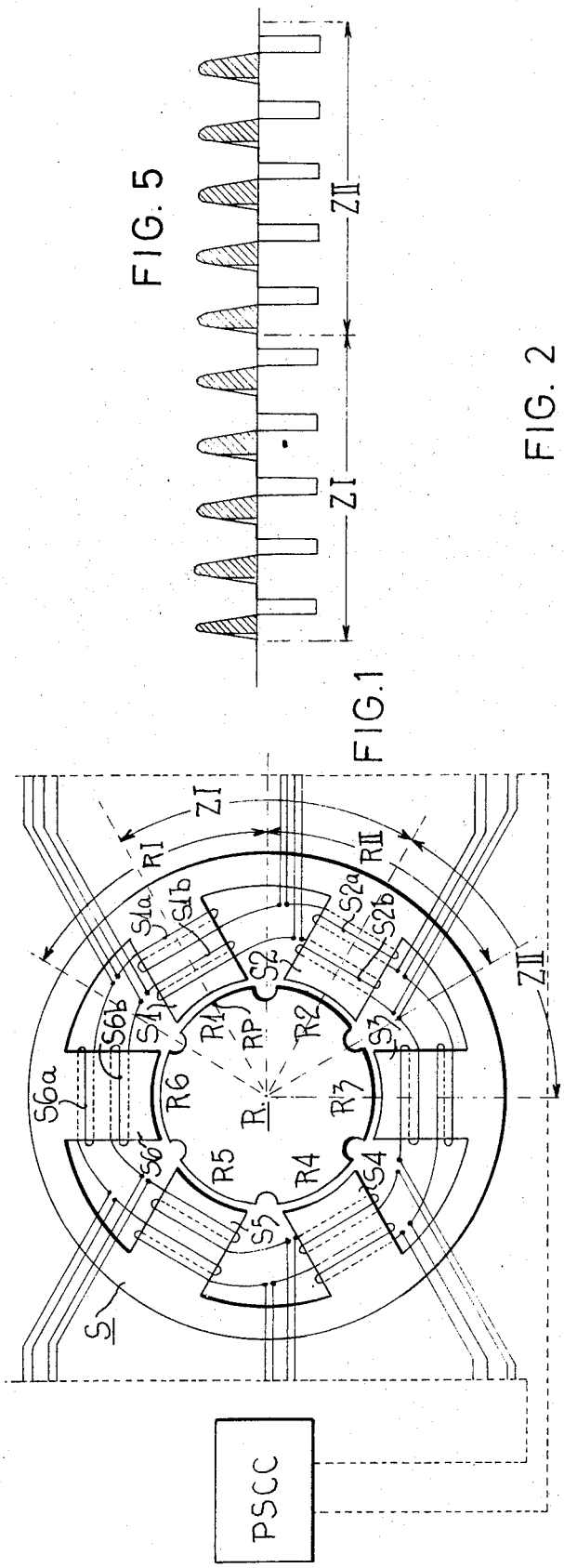
FIG. 1
FIG. 5
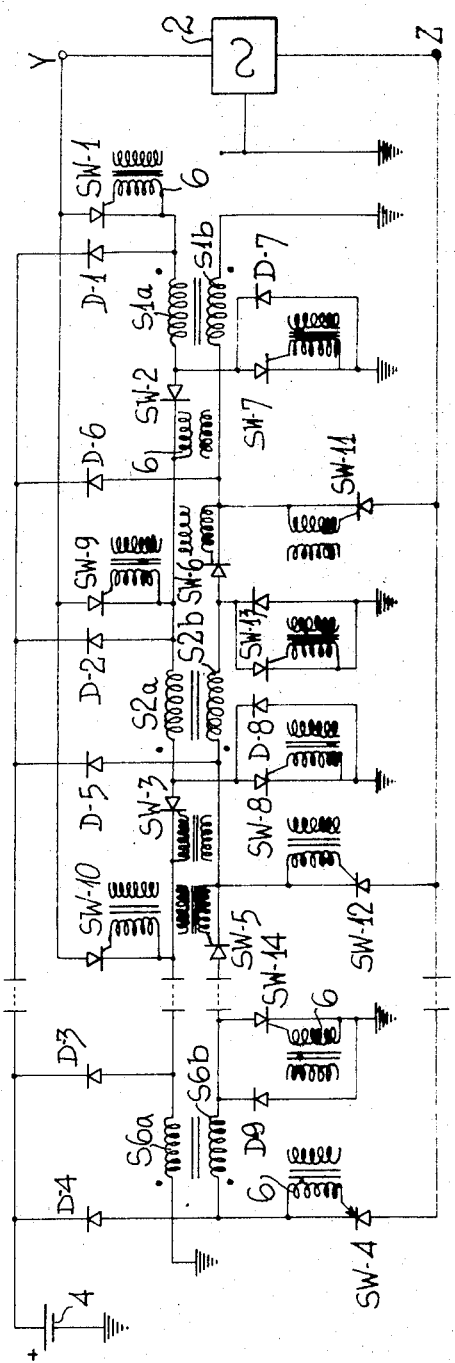
FIG. 2
INVENTOR
NACHUM PORATH
BY *Benjamin J. Barish*
ATTORNEY

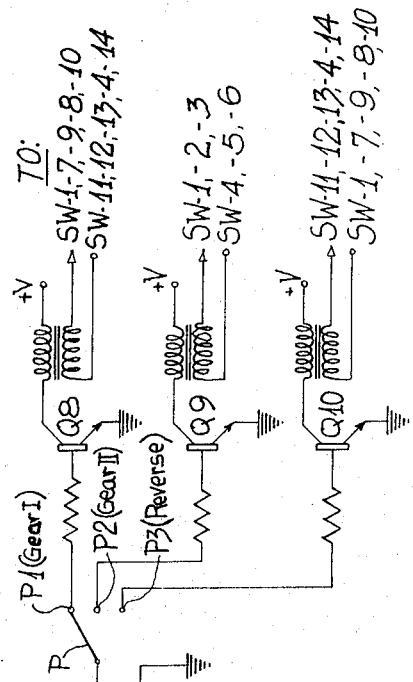
FIG. 3
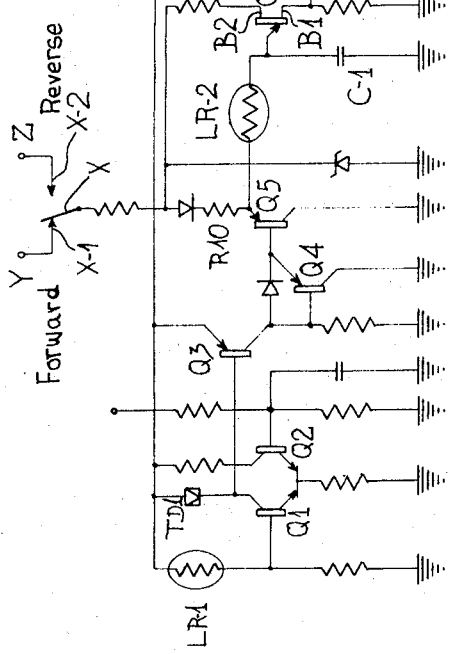
FIG. 4
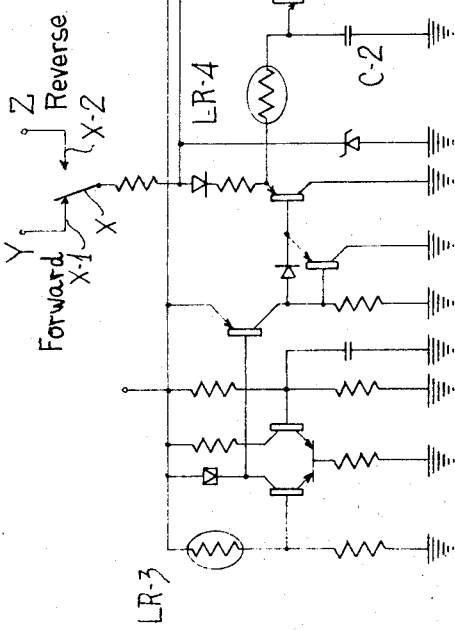

CONTROL SYSTEM FOR ELECTRIC MOTORS

BACKGROUND OF THE INVENTION

1. Field of the Invention

The present invention relates to control systems for electric motors. The invention is particularly applicable for use with the brushless permanent magnet motor described in my U.S. Pat. No. 3,482,156, and is therefore described with respect to that type motor, but it will be appreciated that it could also be used in other applications.

2. Description of the Prior Art

Direct current motors having brushes are widely used today in applications requiring controllable torque over a wide range of speed. One such application is in electric motor vehicles. Such motors, however, have a number of disadvantages primarily because of their use of brushes, since the brushes require continuous maintenance and frequent replacement, and moreover they tend to generate sparks which prevent their use in environments which are prone to fire or explosion.

My prior U.S. Pat. No. 3,482,156 described a brushless permanent magnet motor and control system, which motor has controllable torque characteristics over a wide range of speeds. The described motor has a permanent magnet rotor including at least two poles forming a rotor pole pair, and a stator including at least two poles forming a stator pole pair, each stator pole having a first and a second bifilar winding. Power supply and control means are provided for energizing the stator bifilar windings to provide polarization zones each including two adjacent field regions of opposite polarity, which zones are periodically reversed to form a rotating magnetic field for driving the rotor. THe control system described in that patent, however, it quite complicated, and moreover it is supplied from a direct current source which is not always conveniently available.

An object of the present invention is to provide a control system particularly for use with the brushless motor described in my prior U.S. Pat. No. 3,482,156, which control system is greatly simplified from that described in the above patent; in addition the control system may be supplied from an alternating current source rather than a direct current source.

A further object is to provide an improved electric motor and control system particularly for motor vehicle applications.

BRIEF DESCRIPTION OF THE INVENTION

According to the present invention, the control system for the electric motor described above includes an alternating current source having a frequency of at least several multiples of the rate of polarization zone reversal at maximum motor speed. The system further includes switching means connecting the alternating current source to the first bifilar winding of each stator pole for energizing same with a plurality of half-cycle alternations of one sign when a reference point on the rotor arrives at the beginning of one polarization zone of the stator. The switching means also connects the alternating current source to the second bifilar winding of each stator pole for energizing same with a plurality of half-cycle alternations of opposite sign when the reference point on the rotor arrives at the beginning of the next, oppositely polarized zone, of the stator, i.e., the next zone in which each of the stator poles is oppositely polarized. Further, torque control means are provided for controlling the switching means to control the time of initiation of energization of the energized bifilar windings during each of the half-cycle alternations of the alternating current source, the energized windings being automatically deenergized by the switching means at the end of each said half-cycle alternations.

Such a control system not only has the advantage of utilizing an alternating current source, where that is more conveniently available than a direct current source, but also has the advantage of permitting a substantial simplification of the control system since it eliminates the need of complicated circuitry for deenergizing the field windings at the critical instant, this being effected automatically by the termination of the half-cycle alternations of the alternating current source.

The invention is particularly applicable, and is therefore described below, with respect to a brushless permanent magnet motor including a permanent magnet rotor rotatably disposed within the stator, such as described in my U.S. Pat. No. 3,482,186.

According to a further feature of the invention, the control system further includes a DC voltage source, preferably a rechargeable battery. The switching means effects an electrical connection between the second bifilar winding of each stator pole and the battery during the time the rotor is disposed in the mentioned one polarization zone of the stator, and further effects an electrical connection between the first bifilar winding of each stator pole and the battery during the time the rotor pole is disposed in the mentioned next, oppositely polarized zone of the stator. Unidirectional conducting devices are further provided connected between the bifilar windings and the battery and poled to permit conduction from the bifilar windings to the battery only during the nonduty half cycles, i.e., when the bifilar windings are not connected to the alternating current source, to facilitate magnetic recovery of the windings.

The foregoing arrangement has not only the advantage of facilitating magnetic recovery of the windings, but also the advantage of using the energy stored in the windings for continuously recharging the battery. In an electric motor vehicle application, this would be the vehicle battery used to energize the vehicle electrical accessories. This energy is also used to enhance braking (dynamic) of the motor when coasting.

The described control system includes further means for selectively connecting together all the first bifilar windings in series or parallel, and for selectively connecting together all the second bifilar windings in series or parallel. This permits the motor to be "gear-shifted" from high-torque, low-speed operation (parallel connections) to low-torque, high-speed operation (series connections), and vice versa.

Further features and advantages of the invention will be apparent from the description below.

BRIEF DESCRIPTION OF THE DRAWINGS

The invention is herein described, somewhat diagrammatically and by way of example only, with reference to the accompanying drawings, wherein:

FIG. 1 illustrates a brushless permanent magnet motor of the type described in my U.S. Pat. No. 3,482,156, with respect to which the present invention is particularly applicable for use;

FIG. 2 is a schematic diagram of one form of switching circuit in accordance with the present invention for controlling the drive windings of the motor of FIG. 1;

FIGS. 3 and 4 are schematic diagrams of one form of zone sensing and acceleration control circuit for controlling the switching circuit of FIG. 2, the circuit of FIG. 3 being effective in one polarization zone, and that of FIG. 4 being effective in the next, oppositely polarized zone; and FIG. 5 illustrates a series of waveforms showing the periods of conduction of the drive windings as a result of the control effected by the circuits of FIGS. 3 and 4.

DESCRIPTION OF THE PREFERRED EMBODIMENT

As indicated earlier, the present invention is herein described particularly with respect to the brushless motor and control circuit illustrated in my prior U.S. Pat. No. 3,482,156. Reference may therefore be had to that patent for details of construction and operation which are not described herein and which are not necessary for an understanding of the present invention.

The motor illustrated in FIG. 1 is particularly suitable for use in an electric motor vehicle application. It comprises a stator S and a permanent magnet rotor R rotatably disposed within the stator. Rotor R is preferably made of cylindrical segments of ceramic magnets magnetized along their edges into a plurality of poles R1, R2,–R6. The alternate poles (R1, R3 and R5) are permanently magnetized to form magnetic poles of one direction, viz North, and the remaining alternate poles (R2, R4, and R6) are permanently magnetized to form magnetic poles of the opposite direction, viz, South.

Stator S is also formed with a plurality of poles, namely poles S1, S2,-S6. Each stator pole is wound with a pair of bifilar windings, i.e., windings S1a and S1b for pole S1, windings S2a and S2b for pole S2, and so on through windings S6a and S6b for pole S6. All the bifilar windings are connected to a power supply and control circuit, generally designated by the box PSCC in FIG. 1.

The motor illustrated in FIG. 1 thus comprises six rotor poles forming three rotor pole pairs, and six stator poles forming three stator pole pairs; it could of course have more or fewer poles, there being at least one pole pair in the stator and one pole pair in the rotor.

The foregoing windings are wound and controlled so as to form a rotating magnetic field for driving the rotor. For this purpose, all the "a" bifilar windings are wound in alternate directions so as to produce, when energized, alternately polarized pole fields, called regions. Thus, when winding S1a is energized, it produces a Region I (RI) of one polarization (e.g., North), and when winding S2a is energized, it produces Region II (RII) of the opposite polarization (e.g., South). The "b" bifilar windings are wound in the same direction as their respective "a" windings. However, as will be described below, the polarizations produced by the "b" windings are opposite to those produced by their respective "a" windings because the current in the "b" windings flows in the opposite direction.

The energization of the "a" and "b" windings is controlled by the position of the rotor (i.e., a reference point thereon e.g., midpoint RP of a rotor pole), with respect to the stator. This may be sensed by any known means. For example, in my prior U.S. Pat. No. 3,482,156 there is disclosed an arrangement including photocells or light-sensitive resistors, which sense channels or notches formed on an extension of the rotor shaft. Such an arrangement is utilized here for purposes for example, the photocells being LR-1 (FIG. 3) and LR-3 (FIG. 4), but it will be appreciated that other sensing means could be used.

The energization of the "a" and "b" windings is effected when the reference point RP on the rotor arrives at the midpoint of a field region, which is the beginning of a "Zone," as described in my Pat. No. 3,482,156. Each zone includes parts (one-half) of two adjacent field regions and extends the distance of one-half the angle between adjacent stator pole pairs. Thus, as shown in FIG. 1 there would be two Zones for each pole pair, Zone 1 comprising the second half of Region I (e.g., North) and the first half of Region II (e.g., South) and Zone II comprising the second half of Region II e.g., South) and the first half of the next region I (e.g., North). In the example of FIG. 1, there are three pairs of poles, and therefore there would be three pairs of Zones I, II.

In order to produce the rotating field for driving the rotor, the magnetic field of each stator pole must be reversed when the rotor reference point RP arrives at the beginning of each Zone. This is effected by driving the supply current through one bifilar winding e.g., the "a" winding) in one direction when the rotor reference point RP is in one Zone (e.g., Zone 1), and when the rotor reference point arrives at the beginning of the next, oppositely polarized Zone (e.g., Zone II), driving the current through the other bifilar windings e.g., the "b" winding) in the reverse direction.

All the foregoing functions are performed by the power supply and control circuit PSCC, which also controls the conduction period of the energized windings, and the parallel or series connections thereof, as will be more fully described below.

As shown in FIG. 2, the power supply and control circuit PSCC includes an AC source 2 and a DC voltage source in the form of a rechargeable battery 4, the latter being, in the motor vehicle application mentioned, the battery for the lights, radio and other electrical accessories of the vehicle.

AC source 2 must have a frequency of at least several multiples of the rate of field polarization Zone reversal for maximum motor speed. For example, in a motor vehicle having a maximum speed of 100 km./hour and having tires of 1.6 meters in circumference, the maximum motor speed is about 20 r.p.s. The frequency of the AC supply should be made at least several multiples of this number, e.g., at least 200 c.p.s. In this example, the voltage of AC source 2 may be 160 volts peak, and that of the battery 4 also 160 volts.

The control circuit further includes a plurality of switching means in the form of SCR's ( silicon controlled rectifiers) Sw-1, Sw-2-----Sw-14. The gate electrode of each SCR is connected to a gating coil 6 which receives a pulse (from the circuits of FIGS. 3 and 4) to initiate conduction of the SCR. The bifilar stator winding are connected to AC source 2 through these SCR switches, the latter controlling the time and duration of energization of the windings.

The bifilar stator windings are also connected to battery 4 through a plurality of unidirectional conducting devices, namely diodes D-1, D-2,-------D-9. The cathode side of the diode is tied to a bus connected to the positive side of battery 4, and thus the diodes provide an electrical path to battery 4 from the bifilar windings at the nonduty time of the latter, i.e., when they are not energized by the AC source. Energy stored in the stator windings is thus used to change the battery, and also to brake (dynamic braking) the motor.

The circuit of FIG. 2 operates as follows:

During one-half cycle alternation of the AC source 2, input terminal Y will be positive, and input terminal Z will be negative. The "a" windings (i.e., S1a, S2a---S6a) can be energized only during the half-cycle alternation that input terminal Y is positive, the energization of such windings automatically terminating as soon as that half-cycle alternation is completed and terminal Y becomes negative. Similarly, the "b" windings (i.e., S1b, S2b—S6b) can be energized only during the other half-cycle alternations, when input terminal Z is positive, the energization of such windings also automatically terminating as soon as the half-cycle alternation is completed and terminal Z becomes negative.

The SCR switches SW-1—SW-14 also determine whether the stator windings are connected in series (for low torque, high speed) or parallel (for high torque, low speed). To effect a series connections, SCR switches SW-1, SW-2 and SW-3 are all made to conduct during the first half-cycle alternations of the AC supply, whereby positive half-cycle alternations are passed through the "a " windings S1-A, S2-A-S6-a in series. During the second half-cycle alternations of the power Supply, SCR switches SW-4, SW-5 and SW-6 are made to conduct, whereupon the "b " winding S1b, S2b-S6b are energized in series.

To effect a parallel connection, during the first half-cycle alternations of the power supply when terminal Y is positive, SCR switches SW-1, SW-7 are triggered thereby energizing winding S1a, and SCR switch SW-9, Sw-8 are triggered thereby energizing in parallel winding S2a. The same arrangement is effected for the remaining "A" windings, through winding S6a which is energized in parallel by triggering SCR switch SW-10. All the energized SCR switches are triggered simultaneously.

During the second half-cycle alternations when terminal Z is positive, SCR switch SW-11 is triggered thereby energizing winding S1b; SCR switches SW-12 and SW-13 are triggered thereby energizing winding 2b in parallel; and so on through SCR switches SW-4 and SW-14 which are triggered to energize winding S6b in parallel.

As indicated above, while the "A" windings are energized by the AC source, the "b" windings are connected by their respective diodes D-1—9 to battery 4, and vice versa. Thus, until the battery is completely charged, the energy stored within the windings during the magnetic recover (i.e., non nonenergized) periods of the stator windings is used to charge the battery.

As also indicated above, conduction of the SCR switches is initiated simultaneously and is controlled by pulses applied to their respective gate electrodes from their respective coils 6, and the conduction of all the SCR switch is automatically terminated simultaneously at the end of the half-cycle alternation when the AC supply 2 reverses the polarity in input terminals Y and Z.

Conduction of the SCR switches is controlled by the Zone sensing and acceleration control circuits of FIGS. 3 and 4. The circuit of FIG. 3 is effective when the rotor (i.e. a reference point thereon) is in one Zone (e.g. Zone I), and that of FIG. 4 is effective when the rotor is in the next, oppositely polarized Zone (e.g., Zone II).

The sensing of Zone I and Zone II is shown, for purposes of example, as being effected by photocells or light-sensitive resistors LR-1 (FIG. 3) and LR-3 (FIG. 4), respectively, as described in my U.S. Patent No. 3,482,156. 482, 156, As briefly described earlier, an extension of the rotor shaft is formed with two channels of triangular cross section, each channel cooperating with a light source and a photocell (LR-1, LR-3) whereby each photocell is illuminated three short periods during one complete motor shaft revolution. Each period of illumination of photocell LR-1 is effected when the rotor is in a Zone 1 of the field, and each period of illumination of photocell LR-3 is effected when the rotor is in a Zone II of the field.

In addition, acceleration control of the motor is effected by a foot accelerator pedal which controls a shutter to vary the amount of light supplied to photocell LR-2 (FIG. 3) for Zone I, and photocell LR-4 FIG. 4) for Zone II, as described in U.S. PAT. NO. 3,482,156.

The mechanical details of the Zone sensing and acceleration control devices are not essential for an understanding of the present invention, and reference may be had to my prior U.S. PAT. NO. 3,482,156 for such details.

The control circuits of FIGS. 3 and 4 also include a three position switch P: Position P1 provides forward drive of the motor in Gear 1 (low gear, effected by parallel connection of the stator windings); Position P2 provides forward drive in Gear II (high gear, effected by series connections of the stator windings); and Position P3 provides reverse drive.

The Zone sensing and acceleration control circuit of FIG. 3 for Zone I operates as follows:

Assuming that the motor is to be driven in the forward direction in Gear I, switch P would thus be in position Pl as illustrated, and would be effective to trigger SCR switches SW-1, SW-7, SW—9, SW-8 and SW-10 during the positive half-cycle alternations of the AC source, and SCR switches SW-11 SW-12, SW-13, SW-4, SW-14 during the negative half-cycle alternations. All the other SCR switches are open during this operation.

When the rotor (i.e., a reference point thereon) arrives at the beginning of Zone I, photocell LR-1 will receive light (from the Zone sensing devices briefly referred to above), which causes transistor Q1 to conduct and transistor Q2 to become extinguished. Transistor Q1 pulls its collector current through a tunnel diode Td-1 and the base of transistor Q3, causing the latter to conduct and cutting-off conduction of transistors Q4 and Q5. When this occurs, capacitor C-1 starts to change (positive) through resistor R10 and photocell LR-2.

Photocell LR-2 acts as a variable resistor during this charging operation. As indicated earlier, the ohmic value is determined by the vehicle accelerator (which controls a shutter and thereby the amount of light received by the photocell), as described in my U.S. Pat. No. 3,482,156. A unijunction transistor Q6 has its emitter terminal connected to the positive side of capacitor C-1. When the emitter voltage of unijunction transistor Q6 has reached about half the voltage between its two bases (B1 and B2), capacitor C1 will discharge through the unijunction base B1 path and resistor R11 to ground, causing transistor Q7 to conduct and to generate a short output pulse to the appropriate transistor Q-8, Q-9, Q-10) and SCR switches as shown.

Thus, with switch P in the P1 position (Forward, Gear I), SCR switches SW-1, SW-7, SW-9, SW-8, SW-10 will be closed during the positive half-cycle alternations of the AC source, to energize stator windings S1a, S2a,...S6a, in parallel, thereby providing high torque and low speed; and SCR switches SW-11, SW-12, SW-13, SW-4, SW-14 will be closed during the negative half-cycle alternations, to energize stator windings S1b, S2b...S6b also in parallel.

When switch P is in position P2 (Forward, Gear II,) there will be closed SCR switches SW-1, SW-2, and SW-3 during the positive half-cycle alternations, and SCR switches SW-4, SW-5, SW-6 during the negative half-cycle alternations, thereby connecting the energized stator ("a" and "b," respectively), windings in series, providing low torque and high speed.

Lastly, when the switch is in position P3 (Reverse), the same SCR switches will be closed as in position Pl, except in reverse order to provide parallel connections to the stator windings for reverse, high torque, low speed drive.

When the motor is connected for forward drive, capacitor C-1 is charged through terminal Y of the AC supply via switch X (FIG. 3) which is in position X-1 for this purpose. When the motor is to be operated in reverse drive, switch X is moved to position X-2 to connect the capacitor charging circuit to terminal Z of the AC supply. Cl is discharged to practically zero in the negative half-cycle that follows each charging (positive) half-cycle.

The function of tunnel diode TD-1 is to decrease the changeover time when crossing from one zone to the other.

The Zone sensing and acceleration control circuit of FIG. 4, effective with respect to Zone II, is exactly the same as that of FIG. 3 except that the entry of the rotor into Zone II is sensed by photocell LR-3 (instead of LR-1), and the acceleration control is sensed by photocell LR-4 (instead of LR-3); also capacitor C-2 is charged in accordance with the ohmic value of accelerator photocell LR-4.

FIG. 5 illustrates the wave diagrams of the current supplied to the energized stator windings during the zone I and zone II positions of the rotor. Since in the described example there are three pole pairs, each having a zone I and zone II position of the rotor, it will be appreciated that these diagrams represent only one-third of a cycle of rotation of the rotor, i.e., 120°.

As described, the AC source 2 has a frequency of several multiples of the rate of field polarization reversal for maximum motor speed. It will therefore be seen that there will be a plurality of half-cycle alternations in each zone. Since the SCR switches are conducted only during positive half-cycle alternations, the energized stator windings can receive current only during such positive half-cycle alternations. The period of conduction of the energized stator windings is determined by the rate of charge of capacitor C-1 (zone I) or C-2 (zone II), which in turn is determined by the ohmic value of the accelerator photocell LR-2 or Lr-4. An increase in acceleration will cause the appropriate SCR switches to begin conduction earlier, thereby increasing the period of conduction of the stator windings. Each SCR switch is automatically turned off at the end of each half-cycle alternation, automatically terminating the current supplied to the energized windings. No special circuits are therefore needed, as in my prior U.S. Pat. No. 3,482,156 for terminating conduction of the SCR switches, and the control circuit is thus greatly simplified over that described in my prior patent.

Many modifications, variations, and other applications of the described embodiment will be apparent.

What is claimed is:

1. A control system for an electric motor having a rotor including at least two poles forming a rotor pole pair, and a stator including at least two poles forming a stator pole pair, each stator pole having a first and a second bifilar winding and power supply and control means for energizing said stator windings to provide magnetic polarization zones each including two adjacent field regions of opposite magnetic polarity, which zones are periodically reversed to form a rotating magnetic field for driving the rotor, characterized in that said power supply and control means comprises an alternating current source having a frequency of at least several multiples of the rate of zone reversal at maximum motor speed; switching means connecting said alternating current source to the first bifilar winding of each stator pole for energizing same with a plurality of half-cycle alternations of one sign when a reference point on the rotor arrives at the beginning of one zone of the stator; said switching means connecting said alternating current source to the second bifilar winding of each stator pole for energizing same with a plurality of half-cycle alternations of opposite sign when the said reference point on the rotor arrives at the beginning of the next, oppositely polarized zone of the stator; and torque control means controlling said switching mean to control the time of initiation of energization of the energized bifilar windings during each of said half-cycle alternations of said alternating current source, said energized windings being automatically deenergized by said switching means at the end of each said half-cycle alternations.

2. A control system as defined in claim 1, wherein said system further includes a DC voltage source, said switching means effecting an electrical connection between said second bifilar winding of each stator pole and said DC voltage source during the time the rotor is disposed in said one polarization zone of the stator, and further, reflecting an electrical connection between said first bifilar winding of each stator pole and said DC voltage source during the time said rotor pole is disposed in said next, oppositely polarized zone of the stator; and unidirectional conducting devices connected between said bifilar windings and said DC voltage source, said device being poled to permit conduction from the bifilar windings to the DC voltage source only when the bifilar windings are not connected to said alternating current source to facilitate magnetic recovery of the windings.

3. A control system as defined in claim 2, wherein said DC voltage source is a rechargeable battery.

4. A control system as defined in claim 1, wherein said electric motor is a brushless permanent magnet motor including a permanent magnet rotor rotatable disposed within said stator.

5. A control system as defined in claim 1, including further means for selectively connecting together all said first bifilar windings in series or parallel, and for selectively connecting together all said second bifilar windings in series or parallel.

6. A control system as defined in claim 1, wherein said switching means includes silicon-controlled rectifiers supplied by said alternating current source so as to be conducting only during one half-cycle alternations thereof, and gating means controlled by said torque control means and controlling the initiation of conduction of said silicon controlled rectifiers during said half-cycle alternations.

* * * * *